United States Patent [19]

Cornell

[11] 4,180,979
[45] Jan. 1, 1980

[54] ANTI-STALL CONTROL FOR ELECTRICAL HYDROSTATIC TRANSMISSION CONTROL SYSTEM

[75] Inventor: Charles R. Cornell, Battle Creek, Mich.

[73] Assignee: Eaton Corporation, Cleveland, Ohio

[21] Appl. No.: 918,117

[22] Filed: Jun. 22, 1978

[51] Int. Cl.$^2$ .............................................. F16H 39/46
[52] U.S. Cl. ......................................... 60/395; 60/431; 60/449; 60/DIG. 2
[58] Field of Search ................. 60/390, 391, 395, 423, 60/431, 449, DIG. 2

[56] References Cited

U.S. PATENT DOCUMENTS

| | | | |
|---|---|---|---|
| 2,581,149 | 1/1952 | Shaw | 60/390 |
| 3,173,243 | 3/1965 | Reinke | 60/431 |
| 3,234,726 | 2/1966 | Hann | 60/389 |
| 3,667,225 | 6/1972 | Karman | 60/DIG. 2 |
| 3,768,373 | 10/1973 | Divigard | 91/417 |
| 3,804,191 | 4/1974 | Golan et al. | 180/49 |
| 3,914,938 | 10/1975 | Cornell et al. | 60/395 |
| 3,924,410 | 12/1975 | Cornell et al. | 60/403 |

OTHER PUBLICATIONS

Stout and Kaufman, Handbook of Operational Amplifier Circuit Design, McGraw-Hill, Modulators, 18-3 & 18-8 to 18-14.

*Primary Examiner*—Edgar W. Geoghegan
*Attorney, Agent, or Firm*—R. J. McCloskey; J. Yakimow; L. Kasper

[57] ABSTRACT

A control system for a hydrostatic transmission is disclosed of the type including an engine driven fluid pump and a fluid motor. The control system includes a main control operable in response to an electrical command signal to vary the displacement of the pump, and a command signal generator for generating the command signal. The anti-stall control includes means for comparing electrical signals representative of engine speed and a reference speed, and generating an electrical anti-stall signal representative of the maximum percentage of commanded pump displacement which is permissible without causing the engine to drop below the reference speed. The anti-stall control includes means for electrically multiplying the anti-stall signal and the command signal, downstream of the shaping and rate limiting circuits. The invention provides a simple, inexpensive anti-stall control which can be adjusted to have the maximum possible gain (responsiveness) without inducing circuit instability.

10 Claims, 4 Drawing Figures

ANTI-STALL CONTROL FOR ELECTRICAL HYDROSTATIC TRANSMISSION CONTROL SYSTEM

BACKGROUND OF THE DISCLOSURE

The present invention relates to hydrostatic transmission control systems, and more particularly, to an anti-stall control for use in a control system which is responsive to an electrical command signal.

In hydrostatic transmission control systems of the type in which the displacement of the fluid pump is controlled by means of variations in an electrical command signal, it is generally well known to generate electrical signals representative of actual engine speed and of minimum desired engine speed (or some reference speed), the two speed signals then being compared to generate an anti-stall signal. In such control systems, the command signal to control pump displacement normally originates at a command signal generator, similar to a potentiometer, in which the manual input controls the wiper position.

In typical prior art anti-stall controls the comparison of the two speed signals is performed by an amplifier, the output of which is a DC signal. In one prior art approach, the DC anti-stall signal is used to change the excitation of the command signal generator potentiometer. Typically, control systems which utilize electrical command signals include signal shaping circuits and rate limiting circuits downstream of the signal generator. As a result, using the anti-stall signal to change the excitation of the potentiometer, i.e., upstream of the shaping and rate limiting circuits, causes the response of the system to be relatively slow.

Another approach to using the DC anti-stall signal is illustrated in U.S. Pat. No. 3,914,938, assigned to the assignee of the present invention. In the anti-stall system of the cited patent, the DC command signal and the DC anti-stall signal are inputs to a summing amplifier, with the DC output of the amplifier representing the modified command signal. Although the performance of this prior art control has been generally satisfactory, the adding and subtracting of the command and anti-stall signals require the presence of certain protective circuitry to prevent unintended commands, for example, inadvertently commanding reverse. Such protective circuitry adds substantially to the complexity and expense of the anti-stall control.

Accordingly, it is an object of the present invention to provide an improved anti-stall control for use with a hydrostatic transmission control system operable in response to an electrical command signal.

It is a further object of the invention to provide an anti-stall control in which the anti-stall signal acts on the electrical command signal downstream of the shaping and rate limiting circuitry, while avoiding the necessity of the type of protective circuitry required when the electrical command signal and the anti-stall signal are the inputs to a summing amplifier.

It is another object of the present invention to provide an anti-stall control which generates an electrical anti-stall signal which is representative of a percentage change in the instantaneously commanded displacement of the variable unit (pump or motor) necessary to prevent the engine speed from dropping below a reference speed, such as a predetermined minimum speed.

One problem common to many known anti-stall systems is instability. Instability is typically caused by the fact that the time required to make necessary adjustments in the swashplate position is much greater than the time necessary to generate a modified command signal, such that changes in the engine speed and changes in the swashplate position may be out of phase, causing the engine speed to oscillate. In order to eliminate oscillation from the prior art anti-stall controls, it has generally been necessary to substitute various circuit components, such as capacitors and resistors, after the system is installed on the vehicle.

Accordingly, it is an object of the present invention to provide an anti-stall control in which instability can be eliminated by means of a simple adjustment, after installation of the system on the vehicle.

It is a related object of the present invention to provide an anti-stall control in which the gain of the circuit (i.e., the degree of response to changes in engine speed), can be controlled by the same adjustment which is used to eliminate instability.

SUMMARY OF THE INVENTION

The above and other objects of the present invention are accomplished by the provision of an improved control system for a hydrostatic transmission of the type including an engine driven fluid pump and a fluid motor, either the pump or the motor being of the variable displacement type. The control system includes a main control operable in response to an electrical input command signal to vary the displacement of whichever of the units is variable. The control system further includes a command signal generator for generating an operative command signal, means providing a first electrical input signal representative of actual engine speed, and means providing a second electrical input signal representative of a reference engine speed (such as a predetermined minimum engine speed, or an unloaded engine speed). The improvement comprises means for comparing the first and second electrical input signals and generating an electrical anti-stall signal having a gain between 0.0 and 1.0, the gain being representative of a percentage change in the instantaneously commanded swashplate displacement necessary to prevent the engine speed from dropping below the reference speed. The improvement further comprises means for electrically multiplying the anti-stall signal and the operative command signal to generate a modified input command signal.

DESCRIPTION OF THE PREFERRED EMBODIMENT

Figure 1:
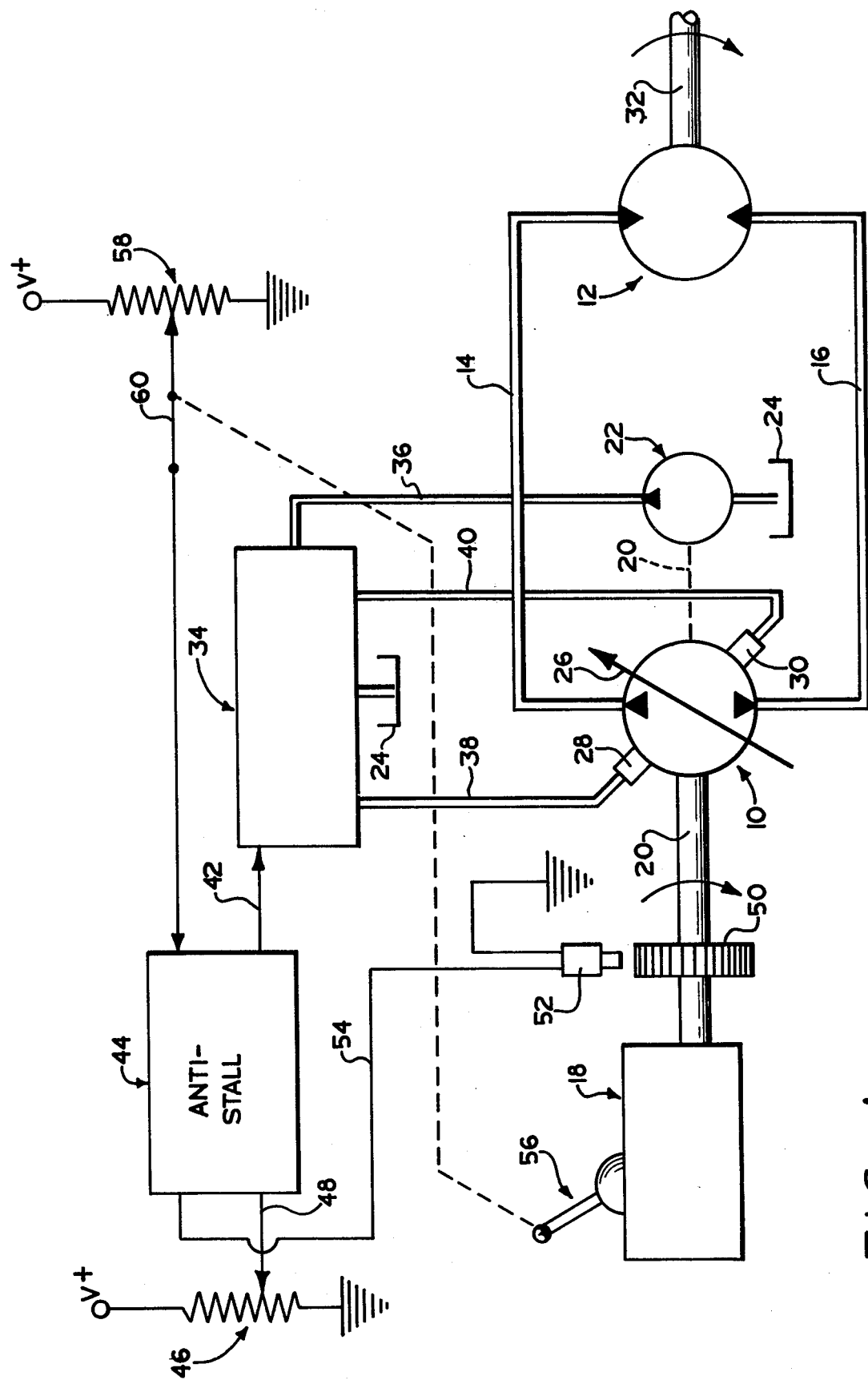
FIG. 1 is a schematic illustration of a hydrostatic transmission control system including the improved anti-stall control, in accordance with the present invention.

Referring now to the drawings, which are not intended to limit the invention, FIG. 1 illustrates a hydrostatic transmission and its associated control system. The hydrostatic transmission includes a variable displacement swashplate fluid pump 10, preferably of the axial piston type, hydraulically connected to a fluid motor 12 by means of conduits 14 and 16. Typically, the motor 12 is a fixed displacement, axial piston unit, although the motor 12 may be variable displacement, with the anti-stall control of the invention applied to the displacement controls of the motor 12.

Input power to the hydrostatic transmission is supplied by an engine 18, by means of an input shaft 20, which drives the rotating group of the pump 10 (as is well known in the art) and also drives a charge pump 22. One function of the charge pump 22 is to supply make-up fluid to the low pressure side of the system by means well known in the art and therefore, not shown in FIG. 1. The charge pump 22 receives its inlet fluid from a fluid reservoir 24.

The pump 10 includes a swashplate 26 which is movable over-center in a known manner by a pair of stroking cylinders 28 and 30. The motor 12 includes an output shaft 32. Various other standard controls, such as relief and shuttle valves, which are well known, and form no part of the present invention, have been omitted from FIG. 1 and the description.

In the control system illustrated in FIG. 1, the displacement of the pump 10, and thus the speed ratio between the input shaft 20 and output shaft 32, is varied by a main control, generally designated 34. The control 34 is capable of changing the position of the swashplate 26 by communicating control fluid, received from the charge pump 22 by means of a conduit 36, to one of the strokers 28 or 30, the control 34 communicating the other of the strokers to the reservoir 24. The control pressure fluid is communicated from the control 34 to the strokers 28 and 30 by means of conduits 38 and 40, respectively. The selective porting of fluid by the control 34 to the strokers 28 and 30 is in response to variations in an electrical input command signal 42.

The control 34 may be of the type illustrated in U.S. Pat. No. 3,924,410, assigned to the assignee of the present invention, and which is incorporated herein by reference. However, the reference to U.S. Pat. No. 3,924,410 is by way of example only and is not intended to limit the present invention. Within the scope of the present invention, it is essential only that the control 34 must be operable to vary the displacement of the variable displacement unit, in response to variations in the electrical input command signal 42.

The input command signal 42 is transmitted to the control 34 from an anti-stall control, generally designated 44. The main input to the anti-stall control 44 is from a command signal generator, generally designated 46, by means of a wiper 48. Operator control of the hydrostatic transmission is accomplished by manual movement of the wiper 48 to effect variations in the magnitude of the command signal transmitted by the wiper 48, as is well known in the art.

As is common to most anti-stall systems, the engine speed is continually compared to some sort of reference speed, for the purpose of sensing an imminent engine stall condition, indicated by a sudden reduction in engine speed, relative to the reference speed. Therefore, one of the inputs to the anti-stall control 44 is actual instantaneous engine speed. A toothed member 50 is mounted for rotation with the input shaft 20, and disposed adjacent the toothed member 50 is a magnetic pick-up 52. As is well known in the art, the magnetic pick-up 52 generates lines of magnetic flux which are cut by the teeth of the member 50 as it rotates, such that the pick-up 52 generates an AC signal whose frequency is directly proportional to the speed of rotation of the member 50. The AC signal is transmitted from the pick-up 52 to the anti-stall control 44 by means of a lead 54.

The other input to the anti-stall control 44 is the reference speed which, in the subject embodiment, is illustrated as being the desired speed of the engine 18, as selected by a throttle setting, generally designated 56. There is provided a throttle setting signal generator, generally designated 58, including a movable wiper 60, the position of which corresponds to the position of the throttle setting 56, as indicated by the dashed line in FIG. 1 connecting the setting 56 and wiper 60.

Figure 2:
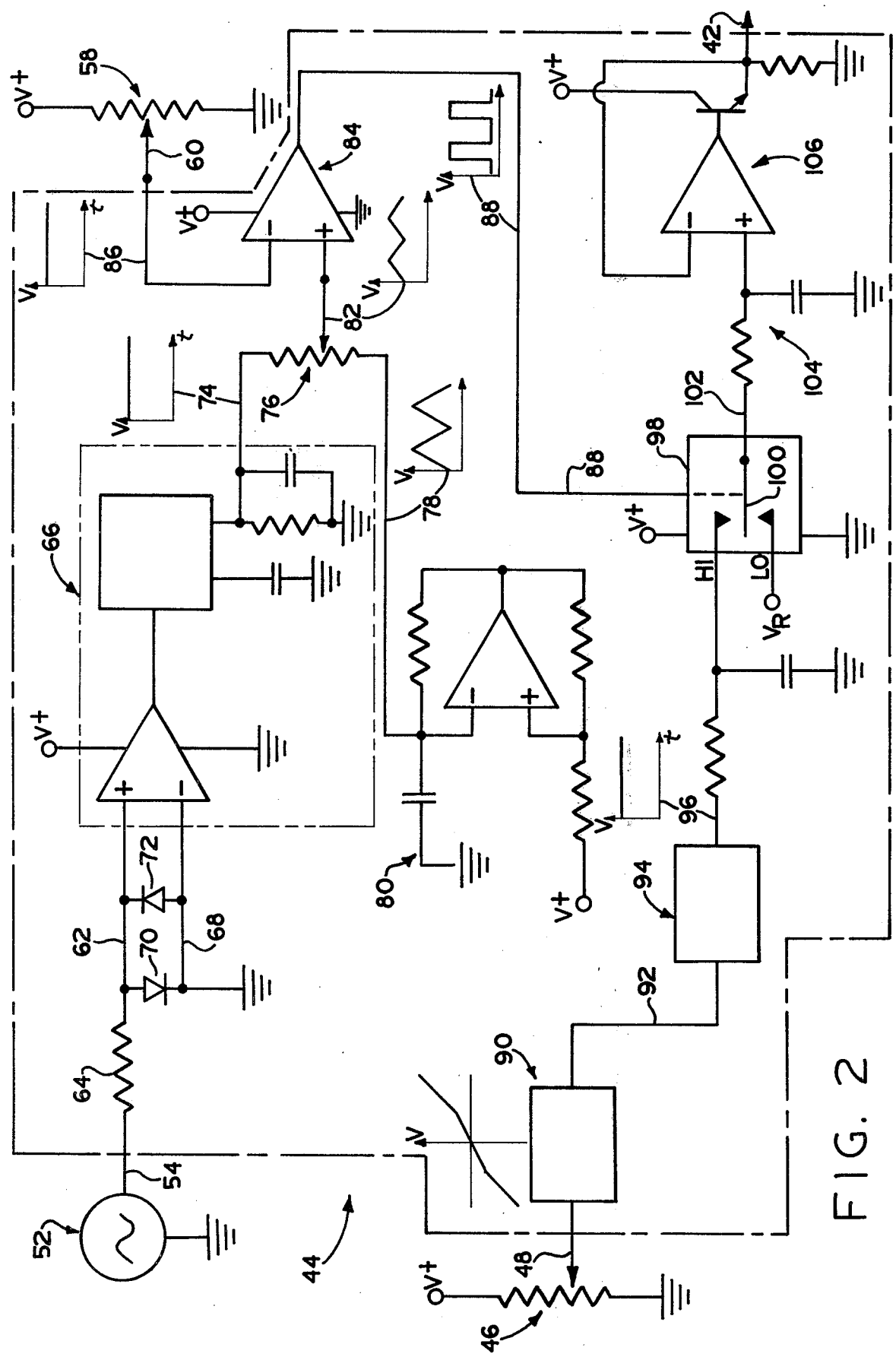
FIG. 2 is a circuit schematic of the anti-stall control of the invention.

Referring now to the circuit schematic in FIG. 2, the anti-stall control 44 of the present invention is shown in greater detail. As described in connection with FIG. 1, the AC signal generated by the pick-up 52 is transmitted to the anti-stall control 44 by means of the lead 54. The AC sine-wave signal transmitted by the lead 54 is conducted to a lead 62 through a resistor 64. The lead 62 is one of the inputs to a frequency-to-voltage converter circuit, generally designated 66, of the type which is well known and commercially available. Also connected as an input to the converter circuit 66 is a grounded lead 68, and connected in parallel between the leads 62 and 68 is a pair of diodes 70 and 72, the characteristics of which are selected to limit the amplitude of the signal transmitted to the converter circuit 66. The function of the converter circuit 66 is to convert the variable frequency AC signal transmitted by lead 62 into a DC signal having a voltage proportional to the frequency of the AC signal.

The DC output of the converter circuit 66 is transmitted by a lead 74 to a gain adjustment potentiometer, generally designated 76. The other input to the potentiometer 76 is by means of a lead 78, connected to the output of an oscillator circuit, generally designated 80, which provides a triangular-wave (or saw-tooth) signal, of a known frequency. The output of the gain adjustment potentiometer 76 is transmitted by means of an adjustable wiper 82 to the plus input of a comparator circuit 84. The minus input of the comparator circuit 84 is connected to the wiper 60 of the throttle setting signal generator 58, by means of a lead 86. As will be described in greater detail subsequently, the function of the gain adjustment potentiometer 76 is to provide a signal on the wiper 82 which is somewhere between the DC signal on the lead 74 and the triangular-wave signal on the lead 78 (a weighted summation). For ease of description of the rest of FIG. 2, as well as the voltage graphs of FIGS. 3 and 4, all subsequent references to the various signals will be by means of the reference numerals used to identify the leads or wipers on which those signals appear.

As an example of the operation of the potentiometer 76, if the wiper 82 is set at the mid-point of the potentiometer 76, the signal 82 will be the mathematical average of the signals 74 and 78. It should be noted that the voltage graphs shown on FIG. 2 are not intended to indicate actual or relative voltages, but are intended merely to illustrate generally the form of each of the signals. It should be understood that the relationship of the magnitudes of signals 74 and 86 is not the same as the relationship of the engine speeds represented thereby.

The comparator circuit 84 compares the signal 82 (plus input) and the signal 86 (minus input), and generates a signal on its output lead 88 which goes to positive saturation (V+) while the signal 82 is greater than the signal 86, and goes to negative saturation (ground) while the signal 82 is less than the signal 86. Because the triangular-wave signal 78 has a known, constant frequency, the resulting square-wave signal 88 has the same constant frequency, and has a duty cycle (ratio of time at positive saturation to total cycle time) representative of the percentage of time that the signal 82 is greater than the signal 86. The duty cycle of the square-wave signal 88 is also representative of the change needed in the input command signal 42 (and hence, the displacement of the swashplate 26) in order to reduce the loading of the engine and prevent the engine speed from dropping below a reference speed, such as the engine speed represented by the throttle setting 56.

Referring again to the gain adjustment potentiometer 76, the reasons for the signal 82 being a combination of the signals 74 and 78 should now be apparant. The amplitude of the triangular-wave 78 is constant, such that changes in magnitude of the DC signal 74, reflecting changes in instantaneous engine speed, result in a change in magnitude of the signal 82. On the other hand, the triangular-wave 78 dictates the frequency of the signal 82 and the square-wave signal 88, while the alternately increasing and decreasing slopes of the signal 78 cause the signal 82 to be alternately above and below the reference signal 86, in turn causing the comparator circuit 84 to attain alternately positive and negative saturation. The effect of variations in engine speed (signal 74), reference speed (signal 86), or the gain adjustment of potentiometer 76 will be discussed in detail in connection with FIGS. 3 and 4.

As was described in connection with FIG. 1, the primary input to the anti-stall control 44 is from the command signal generator 46, by means of the wiper 48. The command signal is transmitted from the wiper 48 to a shaping circuit 90, which is well known and forms no part of the invention. As is indicated by the graph of voltage vs position of the wiper 48, the function of the shaping circuit 90 is to reduce the gain of the command signal around the neutral position of the wiper 48, and increase the gain of the signal further away from neutral. The output of the command signal 90 is trsmitted by a lead 92 to a rate limiting circuit 94 which also is well known and forms no part of the invention. The function of the rate limiting circuit 94 is to limit the rate of change of the electrical command signal as the position of the wiper 48 is changed. The output from the rate limiting circuit 94 will be referred to hereinafter as an "operative" command signal. For reasons which will become apparent subsequently, the phrase "operative command signal" will generally be understood to mean an electrical command signal which may be satisfactorily utilized by the main control 34, and in the subject embodiment, by way of example only, the command signal is "operative" only after the desired shaping and rate limiting has been performed.

The operative command signal is transmitted over a lead 96 to the "HI" terminal of an analog switch 98, the "LO" terminal of the switch 98 being connected to a reference voltage $V_R$. The analog switch 98 includes switching means represented schematically by a movable switching element 100, which is connected to an output lead 102. The analog switch 98 may be viewed as having two alternating "states" or conditions. When the signal 88 is at positive saturation, the lead 102 is connected by means of the switching element 100 to the HI terminal, receiving the operative command signal 96. When the signal 88 is at negative saturation, the lead 102 is connected through the switching element 100 to the LO terminal, receiving the reference voltage $V_R$, representative of a zero or neutral command signal. Accordingly, the output of the analog switch 98 is a signal somewhere between the reference voltage $V_R$ and the operative command signal 96, depending upon the duty cycle of the signal 88. For example, if the signal 88 has a duty cycle of 80%, $V_R$ is 3.0 volts and the command signal 96 is 5.0 volts, the output of the switch 98 will be 4.6 volts, i.e., 3.0 v + 0.8 [5.0 v − 3.0 v].

Therefore, in the subject embodiment, the duty cycle of the signal 88 represents the maximum percentage of the instantaneous command signal 96 which is permissible, without causing the engine speed to drop below a predetermined minimum engine speed (the reference speed indicated by the throttle setting 56). The analog switch 98 effectively performs an electrical multiplication of the operative command signal 96 and the duty cycle of the signal 88 to generate a reduced command signal which will result in a decreased displacement of the swashplate 26, and a reduced load on the engine, and will prevent the engine speed from dropping below the reference speed.

It should be understood that the output of the analog switch 98 is not a smooth, DC signal, but rather, a stepped waveform. Therefore, the lead 102 is connected to a filter circuit, generally designated 104, which changes the stepped waveform into a signal which is basically a DC signal with some "ripple." The command signal is then transmitted to a current amplifier circuit, generally designated 106, the output of which is the input command signal 42 which is then transmitted to the main control 34 as described in connection with FIG. 1.

Figure 3A:
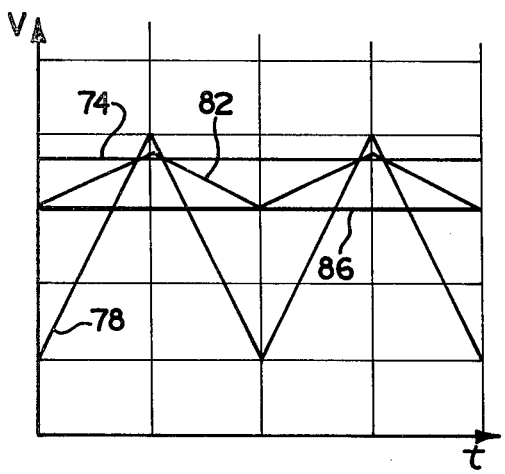
FIG. 3 and FIG. 4 are graphs of voltage vs time for certain of the signals present in the circuit of FIG. 2, FIG. 3 illustrating a higher gain setting and FIG. 4 illustrating a lower gain setting.
Figure 4A:
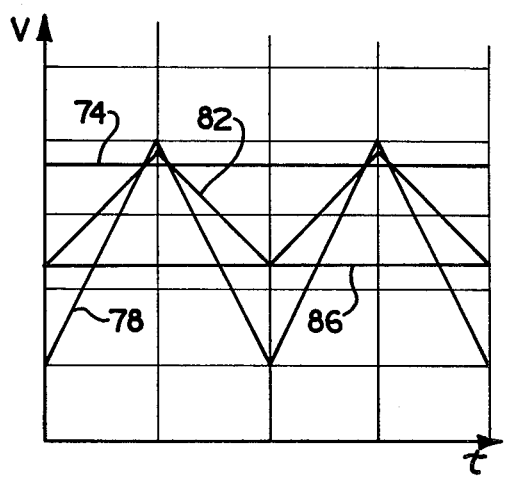
Figure 3B:
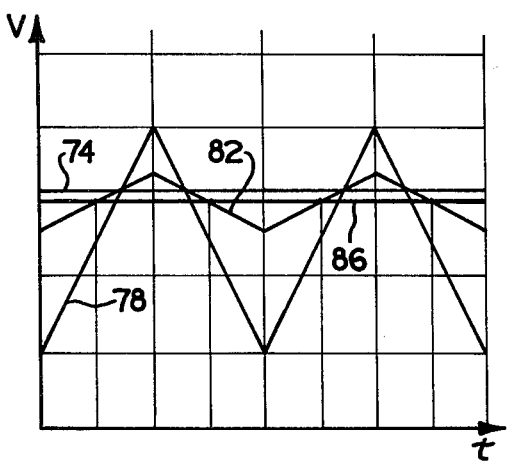
Figure 4B:
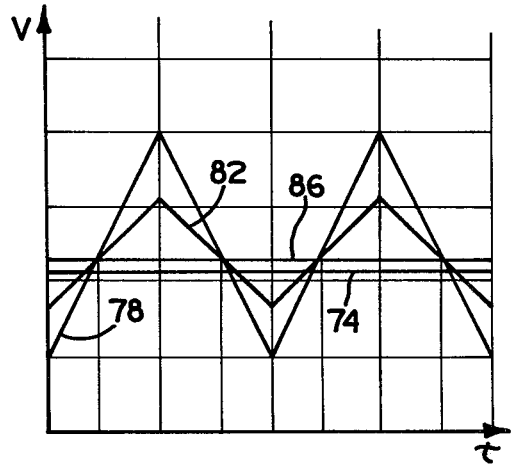
Figure 3C:
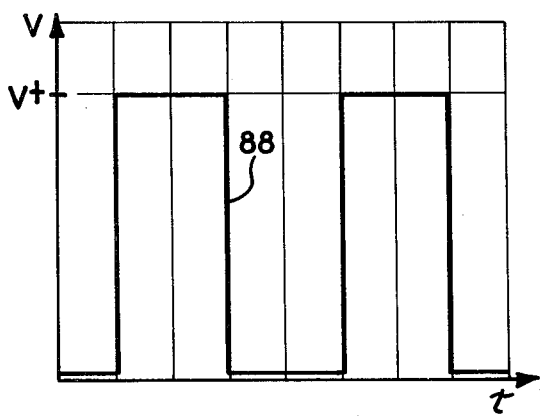

Referring to FIGS. 3 and 4, the effect of variations in the engine speed (signal 74), the reference speed (signal 86), and the gain of potentiometer 76 will now be described in some detail. Before specific reference is made to the graphs of FIGS. 3 and 4, some general observations will be made. Unlike the voltage graphs in FIG. 2, the graphs in FIGS. 3 and 4 are intended to indicate relative voltages of the various signals but, as indicated in connection with the graphs in FIG. 2, the actual magnitudes of the signals are not important. However, for ease of reference in describing FIGS. 3(A), 3(B), 4(A), and 4(B), each line on the voltage coordinate will be considered as representing 1 v. For example, the triangular-wave signal 78, which is always the same, varies between 1 v and 4 v.

The primary difference between the graphs of FIG. 3, and those of FIG. 4 is the different gain setting of the gain adjustment potentiometer 76. In FIG. 3, the gain is 75%, i.e., the wiper 82 is positioned 75% of the way up from input signal 78 (or 25% of the way down from the input signal 74), such that the instantaneous amplitude of the signal 82 is represented by the following equation:

$$\text{signal } 82 = \frac{3(74) + 1(78)}{4}$$

For the graphs of FIG. 4, the gain of the potentiometer 76 is 50%, i.e., the wiper 82 is positioned at the midpoint between the input signals 78 and 74, such that the instantaneous amplitude of the signal 82 is represented by the following equation:

$$\text{signal } 82 = \frac{2(74) + 2(78)}{4}$$

As should be understood by those skilled in the art, in hydrostatic transmission control systems of the type disclosed herein, there may not always be sufficient load on the engine to necessitate a reduction of the operative command signal 96. When this situation occurs, the duty cycle of the signal 88 is 100%, and the input command signal 42 is substantially identical to the command signal 96, such that the displacement of the swashplate 26 will correspond substantially to the displacement indicated by the position of the wiper 48. The 100% duty cycle condition is illustrated in graphs 3(A) and 4(A), in both of which the engine speed signal 74 is 3.67 v. With the potentiometer 76 at the higner gain setting of FIG. 3(A), the signal 82 varies between 3.0 v and 3.75 v. Accordingly, the duty cycle of the signal 88 will be 100% because the signal 82 is always at least equal to the reference signal 86. By comparison, with the potentiometer 76 at the lower gain setting of FIG. 4(A), the signal 82 varies between 2.33 v and 3.83 v, thus illustrating that, as the gain of the potentiometer 76 is decreased, the signal 82 becomes more similar to the signal 78. In FIG. 4(A) it may be seen that the signal 88 will remain at 100% duty cycle only as long as the signal 82 is at least equal to the reference signal 86, or conversely, only as long as the reference signal 86 does not exceed 2.33 v. Therefore, a comprison of FIGS. 3(A) and 4(A) indicates that with the higher gain setting, the predetermined minimum engine speed (reference signal 86) may be set higher, without dropping below 100% duty cycle for the signal 88.

Referring now to FIG. 3(B), and comparing it to FIG. 3(A), it may be seen that the reference signal 86 is still 3.0 v, but the engine speed signal 74 has dropped from 3.67 v to 3.15 v, indicating excessive engine loading. In FIG. 3(B), the signal 82 has the same shape as in FIG. 3(A), because the gain setting is still the same, but the magnitude of the signal 82 is decreased by 75% of the decrease in the engine speed signal 74 (because the gain setting is 75%). As a result, the signal 82 is less than the reference signal 86 for part of each cycle, causing the signal 88 to have a duty cycle less than 100%. As may be seen from FIG. 3(C), the magnitudes of the signals for FIG. 3(B) have been selected to yield a signal 88 having a duty cycle of 50%.

Figure 4C:
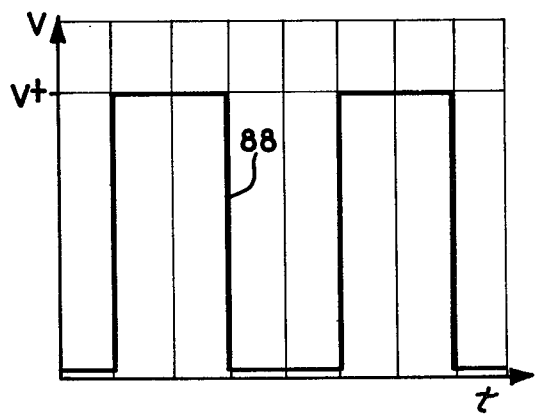

Referring now also to FIGS. 4(B) and 4(C), it may be seen by comparing FIG. 4(B) and 4(A) that the reference speed signal 86 has remained at 2.33 v. However, as was indicated in the comparison of FIGS. 3(A) and 3(B), the engine speed signal 74 has decreased, from 3.67 v to 2.15 v. In comparing FIGS. 4(A) and 4(B), it should again be noted that the signal 82 has the same shape, because the gain is still the same, but that its magnitude is reduced by an amount equal to 50% of the reduction in the speed signal 74 (because the gain setting is 50%). Again, the magnitudes in FIG. 4(B) have been selected to yield a signal 88 having a duty cycle of 50%. As a result, it may be seen that with the potentiometer 76 at the 75% gain setting, a reduction in the engine speed signal 74 of 0.52 v causes the signal 88 to go from 100% duty cycle down to 50% duty cycle, whereas, with the potentiometer 76 at the 50% gain setting, the same reduction to a 50% duty cycle for the signal 88 requires a reduction in the engine speed signal 74 of 1.52 v. Thus, in general, the higher the gain setting of the potentiometer 76, the greater the change in the duty cycle of signal 88 for a given change in the engine speed signal 74.

The practical significance of the adjustability of the gain setting is that after the system is installed on a vehicle, it is possible to "optimize" the performance of the anti-stall control by a simple adjustment of the potentiometer 76. Starting with the gain setting near the minimum (wiper 82 near lead 78), the wiper 82 may be slowly moved in a direction of increased gain setting, until the gain setting reaches a point where it begins to induce instability in the anti-stall control, as evidenced by an oscillating engine speed. From the point at which instability first occurs, the gain setting should then be reduced to a setting slightly below the setting at which the instability is eliminated. The result is an anti-stall control having the highest gain possible (quickest response to imminent engine stall), without causing instability.

When the anti-stall control 44 of the present invention is used in a system such as that shown in FIG. 1 wherein the signal 86 is representative of the throttle setting 56, the above-described adjustment of the gain setting of the potentiometer 76 is the only major system adjustment required after installation of the control on the vehicle. However, in many applications of such anti-stall controls, the engine is intended to run at a constant speed at all times during the operation of the vehicle, in which case, it would be preferable for the position of the wiper 60 of the signal generator 58 to be an adjustable setting, rather than being connected to the throttle setting 56. In the type of arrangement just described, the position of the wiper 60 would be adjusted after installation of the control on the vehicle, and would be set to correspond to a predetermined minimum engine speed (previously referred to as the reference speed). For example, in a typical installation, the throttle of the vehicle engine might be set so that the engine would run continuously at 2200 rpm, with the wiper 60 being adjusted to correspond to an engine speed of 2000 rpm. Again, it should be remembered that the relationship between these engine speeds is not necessarily the same as the relationship between the magnitude of the signals 74 and 86. In general, the adjustment of the wiper 60 might be considered to represent a minimum "unloaded" engine speed, with a drop in actual engine speed below the unloaded engine speed indicating an excessive or undesired load on the engine.

It should be apparent that various modifications of the system may be made, within the scope of the invention. For example, if the anti-stall control is part of a control system for a variable displacement fluid motor, the anti-stall signal 88 will represent an increase in motor displacement (rather than decrease in pump displacement) necessary to prevent the engine speed from dropping below the reference speed.

What is claimed is:

1. In a control system for a hydrostatic transmission of the type including an engine driven variable displacement fluid pump, the control system including main control means operable in response to an electrical input command signal to vary the displacement of the fluid pump, command signal generator means for generating an operative command signal, means providing a first electrical input signal representative of actual engine speed, and means providing a second electrical signal representative of unloaded engine speed, the improvement comprising:

(a) means for comparing said first and second electrical input signals and generating an electrical anti-stall signal representative of the maximum percentage of instantaneously commanded pump displacement which is permissible without causing the engine to drop below a predetermined minimum engine speed; and (b) means for electrically multiplying said anti-stall signal and said operative command signal to generate a reduced input command signal.

2. The improvement as claimed in claim 1 wherein said multiplying means comprises electronic switching means operable to switch its output between said operative command signal and a reference signal representative of a minimum pump displacement in response to changes in said anti-stall signal.

3. The improvement as claimed in claim 1 or 2 wherein said anti-stall signal comprises a substantially square-wave having a duty cycle approximately equal to said maximum permissible percentage of pump displacement.

4. The improvement as claimed in claim 1 wherein said command signal generator means includes rate limiting circuit means and signal shaping circuit means.

5. In a control system for a hydrostatic transmission of the type including an engine driven fluid pump and a fluid motor, one of said pump and said motor being of the variable displacement type, the control system including main control means operable in response to an electrical input command signal to vary the displacement of the variable one of the pump and motor, command signal generator means for generating an operative command signal, means providing a first electrical input signal representative of actual engine speed, and means providing a second electrical input signal representative of unloaded engine speed, the improvement comprising:

(a) means for comparing said first and second electrical input signals and generating an electrical anti-shall signal having a gain between 0.0 and 1.0, the gain being representative of a percentage change in the instantaneously commanded swashplate displacement necessary to prevent the engine speed from dropping below a predetermined minimum; and (b) means for electrically multiplying said anti-stall signal and said operative command signal to generate a modified input command signal.

6. The improvement as claimed in claim 1 or 5 wherein said comparing and generating means includes means providing an oscillating signal having a substantially constant frequency.

7. The improvement as claimed in claim 6 wherein said comparing and generating means further includes means providing a signal which is a weighted summation of said first electrical input signal and said oscillating signal, said summation signal having an alternately increasing and decreasing magnitude.

8. The improvement as claimed in claim 7 wherein said comparing and generating means further includes electrical comparator circuit means for comparing said second electrical input signal and said summation signal and generating said electrical anti-stall signal.

9. The improvement as claimed in claim 8 wherein said anti-stall signal comprises a substantially square-wave signal, alternating between maximum and minimum magnitudes, said electrical anti-stall square-wave signal having one of said magnitudes when said summation signal is greater than said second electrical input signal and having the other of said magnitudes when said summation signal is less than said second electrical input signal.

10. The improvement as claimed in claim 7 wherein said means providing said weighted summation signal includes means for adjusting the weight factor of said summation signal.

* * * * *